United States Patent [19]

Golyak et al.

[11] 4,392,805

[45] Jul. 12, 1983

[54] CENTRIFUGAL CASTING APPARATUS

[76] Inventors: Oleg L. Golyak, Rusanovskaya naberezhnaya, 24/15, kv. 100; Leonty A. Golyak, Kolomievsky pereulok, 13/23, kv. 44; Ivan R. Stepurenko, ulitsa Petra Zaporoshtsa, 13-B, kv. 18, all of Kiev, U.S.S.R.

[21] Appl. No.: 202,703

[22] Filed: Oct. 31, 1980

[51] Int. Cl.³ .............................................. B29C 5/04
[52] U.S. Cl. ........................................ 425/206; 65/71; 65/302; 164/114; 164/136; 164/286; 164/297; 425/425; 425/426
[58] Field of Search ...................... 425/206, 425, 426; 164/286, 297, 114, 136; 65/71, 302

[56] References Cited

U.S. PATENT DOCUMENTS

| | | | |
|---|---|---|---|
| 7,383 | 5/1850 | Parry | 164/136 |
| 2,404,464 | 7/1946 | Sewell | 425/426 |
| 2,450,755 | 10/1948 | Higgins | 164/114 |
| 2,497,160 | 2/1950 | Fejmert | 425/426 |
| 3,672,429 | 6/1972 | Lajoye | 164/286 |

FOREIGN PATENT DOCUMENTS

| | | | |
|---|---|---|---|
| 1587187 | 3/1970 | France | |
| 520181 | 7/1976 | U.S.S.R. | |
| 582891 | 12/1977 | U.S.S.R. | 164/286 |

*Primary Examiner*—James H. Derrington
*Attorney, Agent, or Firm*—McAulay, Fields, Fisher, Goldstein & Nissen

[57] ABSTRACT

A centrifugal casting apparatus comprises a mold mounted for rotation about the vertical axis thereof and having a bottom provided with a through axial opening. A member having a helicoidally shaped surface is axially mounted within the opening in the bottom. The member has a lower portion to be immersed into a melt and extending out of the opening and downwardly of said bottom of the mold. The mold and the member are connected with a rotation drive and a vertical motion drive.

14 Claims, 10 Drawing Figures

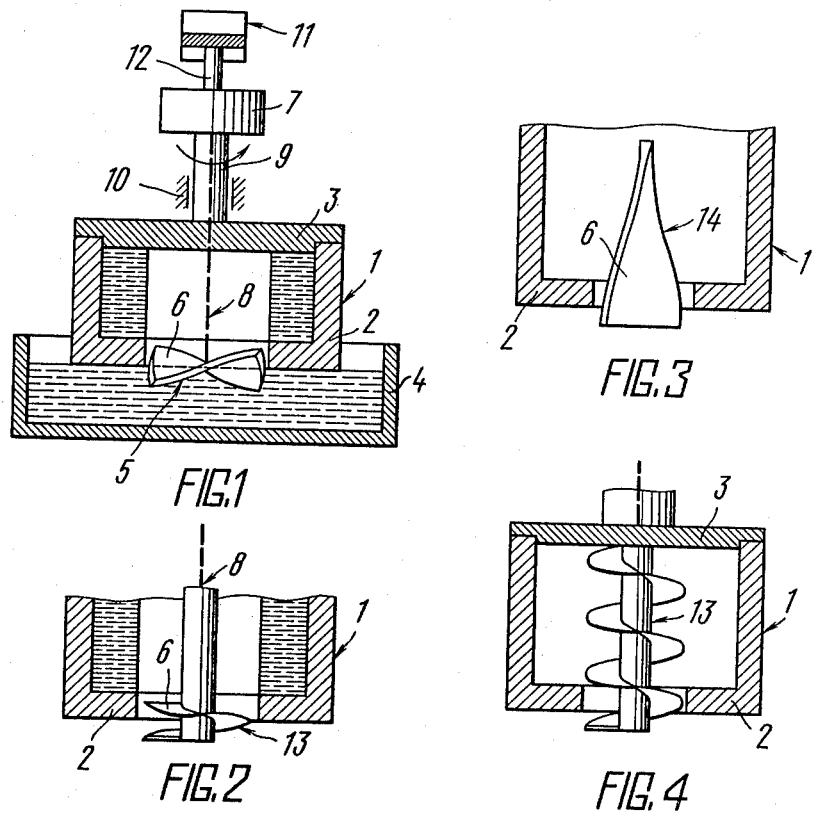

CENTRIFUGAL CASTING APPARATUS

BACKGROUND OF THE INVENTION

1. Field of the Invention

The present invention relates to processing equipment for casting articles and particularly to centrifugal casting apparatus. Most advantageously the invention can be used in machine building and some other branches of industry for centrifugal casting of articles from ferrous and non-ferrous metals and also from glass, plastics, and ceramics.

2. Description of the Prior Art

Though the centrifugal casting has been known and widely used for a long period of time, there still exist difficulties relating to filling the mould with a melt and proportioning the same. The fact that a great number of patents concerning improvements in centrifugal casting apparatus have been recently granted to inventors in various countries shows that this problem is very urgent at present. Even now in some enterprises, molds are manually filled with a melt by pouring it from above with the aid of a dipper serving as a batch meter. The above procedure makes it possible to accurately measure out the batches of the melt without any special equipment and to rule out the formation of crusts on the outer surface of the mould. However, this same procedure fails to provide for a high efficiency of the production process and is very labor-consuming.

Known in the art are apparatus which allow proportioning the melt and filling the molds therewith to be mechanized and, to some extent, automatized. In particular, there is known a centrifugal casting apparatus comprising a mold mounted for rotation about its vertical axis and having a bottom provided with an axial sprue channel (see French Pat. No. 1,587,187, Int. Cl.$^2$ B 22 D 13/00). In direct communication with the sprue channel is a siphon tubing extending therefrom into the melt contained in a crucible. The melt is delivered into the mold through the siphon tubing by an electromagnetic pump or a vacuum pump.

The mold being filled with the melt, a casting starts to solidify around its periphery and at the same time is fed with the portion of the melt contained in the siphon tubing. Owing to the large diameter of the siphon tubing and the presence of a heat insulating material, this portion of the melt solidified last to form a shrinkage head. It is clear that this shrinkage head is to be removed to obtain a finished product, which removal involves additional expenditures and irretrievable losses of the process raw material. In addition, electromagnetic pumps are unusable for casting plastics, glass, and ceramics, while vacuum pumps are inefficient for casting high density materials.

Known in the art is also a centrifugal casting apparatus wherein a melt is delivered into a mold by centrifugal forces, as described in USSR Inventor's Certificate No. 520,181, Int. Cl.$^2$ B 22 D 13/10. This apparatus comprises a mold mounted for rotation about the vertical axis thereof and having a bottom provided with a through axial opening. At the opening in the bottom there is disposed a means adapted to be partially immersed into the melt for feeding the latter into the mold. This means is made in the form of a collect secured to the bottom of the mold and having an upwardly extending channel. The mold and collet are connected with a rotation drive and a vertical motion drive. By lowering the mold being rotated the collet is immersed into the melt which, under the action of centrifugal forces, ascends through the channel in the collet and fills the mould. Then the assembly of the mold and collet is raised; as this takes place, the major part of the melt pours down from the collet into the dispensing crucible. However a part of the melt inevitably remains in the collet, which impairs the accuracy of the proportioning and leads to the formation of a shrinkage head. It will be understood that the removal of the shrinkage head involves additional expenditures and irretrievable losses of the process raw material. In addition, the above apparatus suffers from another drawback which consists in that slag inevitably gets into the mold thereby adversely affecting the quality of the castings.

SUMMARY OF THE INVENTION

The principal object of the invention is to provide a centrifugal casting apparatus which prevents the formation of a shrinkage head.

Another object of the invention is to improve the accuracy of melt proportioning and to reduce the consumption of process raw materials.

Another important object of the present invention is to provide a centrifugal casting apparatus which prevents the contamination of the mold with slag.

An additional object of the invention is to improve the quality of castings produced by centrifugal castings.

Another object of the invention is to preclude the formation of segregations in castings in the course of centrifugal casting of alloys.

Still another important object of the present invention is to provide for a higher rate of filling the mold with a melt during the centrifugal casting process.

These and other objects of the present invention are attained in a centrifugal casting apparatus comprising a mold mounted for rotation about the vertical axis thereof and having a bottom provided with a through axial opening, a means for feeding a melt into the mold, disposed at the entrance to the opening in the bottom and adapted to be partially immersed into the melt, a rotation drive connected with the mold and said means for feeding a melt, and a vertical motion drive for vertically moving the mold and said means, wherein, according to the invention, the means for feeding a melt into the mold is a member having a helicoidally shaped surface, axially mounted within the opening in the bottom and having a lower portion extending out of the opening and downwardly of the bottom of the mold.

The above arrangement enables the inner surface of the opening in the bottom to be disposed vertically so that no melt remains on the vertical surface of the opening when the mold is raised, which rules out the formation of a shrinkage head. It is also to be noted that while lowering the mold, the lower portion of said member comes into contact with the melt, which member, owing to its rotation, throws the slag aside and thus clears the surface of the melt therefrom. In this way, the possibility of contamination of the mold with the slag is excluded, which improves the quality of the produced castings.

It is expedient that the member having a helicoidally shaped surface be constructed in the form of a screw.

The best results are attained where the ratio between the diameter of said screw and the diameter of the opening in the bottom is 0.1 to 1.

Structurally, the simplest embodiment is a modification of the centrifugal casting apparatus, wherein said member is made in the form of a helicoidally shaped plate which is essentially a screw.

Where the mold is tall, it is advisable that the length of the screw be equal to the height of the mold thus allowing the melt filling the mold to be evenly distributed over the whole inner surface thereof.

A high rate of filling the mold with a melt is provided by a modification of the centrifugal casting apparatus wherein the flight of the screw is made in the form of a tube having an open lower end and an open upper end.

High efficiency of the centrifugal casting process is also provided for by a modification of the apparatus wherein the screw is a multiple-start one.

It has been found that the number of flights of the screw should preferably correspond to from 2 to 6 starts.

It is advisable that the screws be made hollow and filled with a cooling medium. This makes it possible to equalize the temperature of the screw throughout its whole length and thus to prevent the distortion or failure thereof caused by thermal strain. In addition, it is possible in this case to make the screw from an inexpensive structural steel and to employ it for manufacturing steel casting.

It has been found that no segregations occur in the castings when the mold and screw rotate with different speeds. Therefore, it is advisable that the screw and the mold be differentially connected with the rotation drive.

In particular, it is advisable that the screw and the mold be mounted on the ends of coaxially arranged output shafts of a differential gear whose input shaft is connected with said rotation drive.

The best results are attained when the differential gear has a gear ratio which enables the ratio between the angular speed of the screw and that of the mold to be maintained within the range of 1 to 2.

Simple in construction is a modification of the centrifugal casting apparatus wherein the member having a helically shaped surface is rigidly connected with the mold.

In another modification of the centrifugal casting apparatus this member is made in the form of helicoidally arranged protrusions on the inner surface of the opening in the bottom of the mold.

The above member may also be made in the form of an impeller whose blades are secured to the bottom of the mold.

The last two modifications of the centrifugal casting apparatus are useful in casting products from glass and ceramics.

BRIEF DESCRIPTION OF THE DRAWINGS

The invention will now be explained in greater detail with reference to specific embodiments thereof which are represented in the accompanying drawings, wherein:

FIG. 1 is a front elevational view, partly in section, showing the centrifugal casting apparatus of the present invention;

FIG. 2 is a partial, cross-sectional view of the apparatus wherein the member having a helicoidally shaped surface is a screw;

FIG. 3 is the same as FIG. 2 and shows an embodiment of the present invention wherein the member having a helicoidally shaped surface is made in the form of a helicoidally shaped plate;

FIG. 4 is the same as FIG. 2 and shows an embodiment of the present invention wherein the length of the screw is equal to the height of the mold;

DESCRIPTION OF THE PREFERRED EMBODIMENTS

Figure 5:
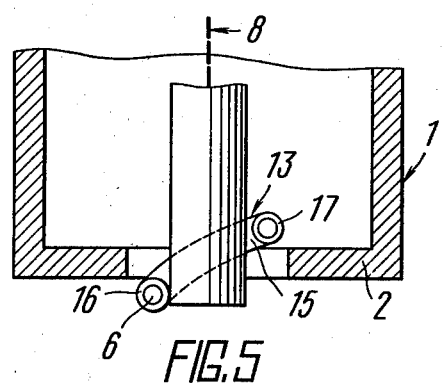
FIG. 5 is the same as FIG. 2 and shows an embodiment of the present invention wherein the flight of the is made in the form of a tube.

Reference is now made of FIG. 1 showing a centrifugal casting apparatus which comprises a mold 1 mounted for rotation about its vertical axis and having a bottom 2 provided with a through axial opening. The mold 1 has also a detachable cover 3. Under the mold 1 there is disposed a dispensing crucible 4 containing a melt. A means for feeding a melt into the mold 1 is disposed at the entrance to the opening in the bottom 2 of the mold 1. According to the invention, said means for feeding a melt into the mold 1 is a member 5 having a helicoidally shaped surface 6. The member 5 is axially mounted within the opening in the bottom 2 and has a lower portion extending out of the opening and downwardly of the bottom 2 of the mold 1 and adapted to be immersed into the melt.

The member 5 is operatively connected with a rotation drive 7 (the operative connection is shown by a dotted line 8). The mold 1 is also operatively connected with the rotation drive 7 by means of a shaft 9 secured to the cover 3 and disposed in a guide 10.

The rotation drive 7 is operatively connected with a vertical motion drive 11 which is made in the form of a power cylinder whose rod 12 is linked to the rotation drive 7.

FIG. 2 of the accompanying drawings shows an alternative embodiment of the present invention wherein the member 5 having the helicoidally shaped surface 6 is, according to the invention, made in the form of a screw 13. The ratio between the diameter of the screw 13 and the diameter of the opening in the bottom 2 should preferably be 0.1 to 1.

FIG. 3 of the accompanying drawings shows an alternative embodiment of the present invention wherein the member 5 having the helicoidally shaped surface 6 is made, according to the invention, in the form of a helicoidally shaped plate 14 which is essentially a one-start screw.

FIG. 4 of the accompanying drawings shows an alternative embodiment of the present invention wherein the length of the screw 13 is, according to the invention, equal to the height of the mold 1. This being the case, the screw 13 is rigidly secured to the cover 3 of the mold 1.

FIG. 5 of the accompanying drawings shows an alternative embodiment of the present invention wherein the flight of the screw 13, according to the invention, is made in the form of a tube 15 having an open lower end 16 and an open upper end 17.

Figure 6:
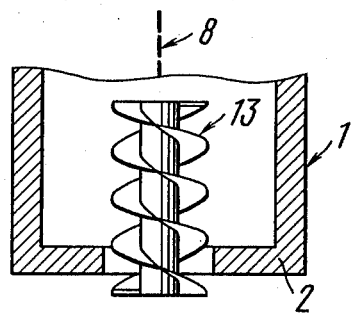
FIG. 6 is the same as FIG. 2 and shows an embodiment of the present invention wherein the screw is a multiple-start one.

FIG. 6 of the accompanying drawings shows an alternative embodiment of the present invention wherein the screw 13, according to the invention, is made as a multiple-start one (in this case, two-start). The most preferable is a modification of the multi-start screw 13 provided with a number of flights which corresponds from 2 to 6 starts.

Figure 7:
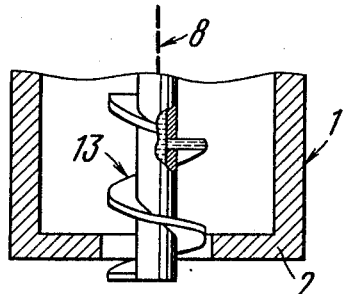
FIG. 7 is the same as FIG. 2 and shows an embodiment of the present invention wherein the screw is made hollow.

FIG. 7 of the accompanying drawings shows an alternative embodiment of the present invention wherein, according to the invention, the screw 13 is made hollow and is filled with a cooling medium, such as sodium.

Figure 8:
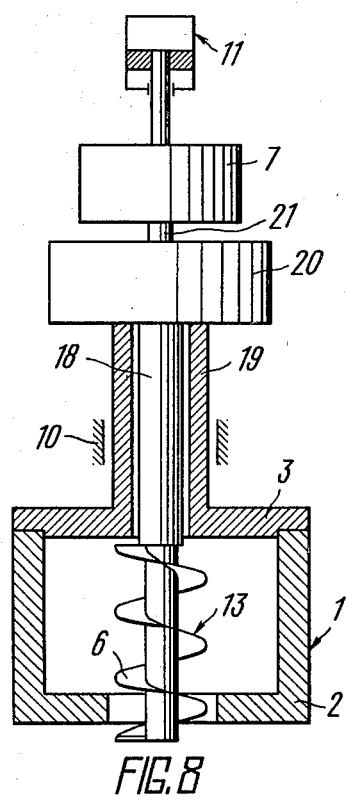
FIG. 8 is the same as FIG. 1 and shows an embodiment of the present invention wherein the screw and the mold are differentially connected with the rotation drive.

FIG. 8 of the accompanying drawings shows an alternative embodiment of the invention wherein, according to the invention, the screw 13 and the mold 1 are differentially connected with the rotation drive 7, the screw 13 and the mold 1 being respectively mounted on the ends of coaxially arranged output shafts 18 and 19 of a differential gear 20. The output shafts 18 and 19 are disposed in the guide 10. An input shaft 21 of the differential shaft 20 is connected with the rotation drive 7 which, in turn, is connected with the vertical motion drive 11 by means of the rod 12. It is preferable that the differential gear 20, according to the invention, have a gear ratio which enables the ratio between the angular speed of the screw 13 and that of the mold 1 to be maintained within the range of 1 to 2.

Figure 9:
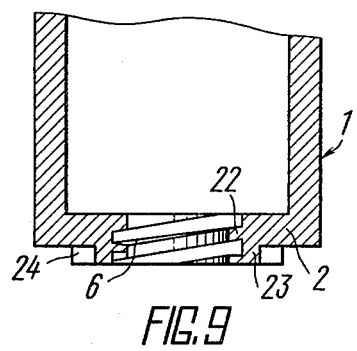
FIG. 9 is the same as FIG. 2 and shows an embodiment of the present invention wherein the member having a helicoidally shaped surface is made in the form of helicoidally arranged protrusions on the inner surface of the opening in the bottom of the mold.

FIG. 9 of the accompanying drawings shows an alternative embodiment of the invention wherein the member 5 having the helicoidally shaped surface 6 is made in the form of helicoidally arranged protrusions 22 on the inner surface of the opening in the bottom 2 of the mold 1. The bottom 2 of the mold 1 has a protrusion 23 disposed in coaxial relationship therewith and intended for immersing into the melt. Blades 24 are secured to the outer surface of the protrusion 23.

Figure 10:
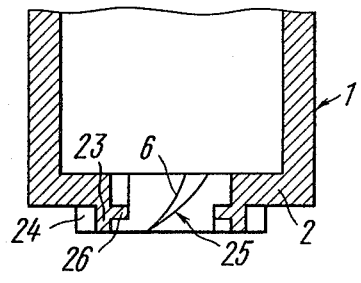
FIG. 10 is the same as FIG. 2 and shows an embodiment of the present invention wherein the member having a helicoidally shaped surface is made in the form of an impeller.

FIG. 10 of the accompanying drawings shows an alternative embodiment of the invention wherein the member 5 having the helicoidally shaped surface 6 is made in the form of an impeller 25 whose blades 26 are secured to the bottom of the mold 1. The bottom 2 has a protrusion 23 disposed in coaxial relationship therewith and intended for immersing into the melt. Blades 24 are secured to the outer surface of the protrusion 23.

In the embodiments of the invention shown in FIGS. 4, 9 and 10 of the accompanying drawings, the member 5 having the helicoidally shaped surface 6 is, according to the invention, rigidly connected with the mold 1.

The centrifugal casting apparatus of the present invention operates in the following way. The drive 7 (FIG. 1 of the accompanying drawings) imparts rotation to the mold 1 and the member 6 having the helicoidally shaped surface 6. The drive 11 lowers the mold 1 and said member 5. Coming into contact with the molten slag covering the surface of the melt of the process material the member 5 throws the same slag aside thereby clearing the surface of the process material melt under the mold 1. The drive 11 is deenergized at the moment the bottom 2 of the mold 1 comes into contact with the surface of the melt.

The member 5, by rotating, delivers the melt into the mold 1 through the opening in the bottom 2 thereof. Under the action of the centrifugal forces the melt is forced to the wall of the mold 1 and thus forms a layer being continuously built up. The inner diameter of a casting is determined by the diameter of the opening in the mold bottom 2. On completion of filling the mold 1, the excess melt flows down the vertically extending surface of the opening into the dispensing crucible 4. At this moment the drive 11 starts raising the mold 1 and the member 5. Upon solidification of the melt, the drive 7 shuts down thereby bringing the mold 1 and the member 5 to a stop. The cover 3 is detached from the mold 1 to remove a finished casting therefrom.

The embodiments of the invention shown in FIGS. 2, 3, 4 and 6 operate in a manner similar to that described above.

According to the embodiment of the invention shown in FIG. 5 of the accompanying drawings, the melt is delivered into the mold through the tube 15 which serves as a flight of the screw 13. The melt is trapped by the open lower end 16 of the tube 15 and forced into the mold 1 through the open upper end 17.

The embodiment of the invention shown in FIG. 7 of the accompanying drawings operates substantially as described above. In this case, however, the inner space of the screw 13 is filled with a liquid cooling medium, such as molten sodium which circulates the in to equalize the temperature of the screw 13 throughout the whole height thereof.

The embodiment of the invention shown in FIG. 8 of the accompanying drawings operates in the following manner. The drive 7 imparts rotation to the input shaft 21 of the differential gear 20. The outer output shaft 19 rotates the mold 1 while the inner output shaft 18 rotates the screw 13. The above shafts 18 and 19 rotate with different angular speeds.

The embodiment of the invention shown in FIG. 9 of the accompanying drawings operates in the following manner. When the mold 1 is lowered, the protrusions 23 of the bottom 2 comes into contact with the slag. The blades 24 throw the slag aside. The mold is lowered until the bottom 2 thereof comes into contact with the surface of the melt which is trapped by helicoidally arranged protrusions 22 and delivered into the mold 1.

The embodiment of the invention shown in FIG. 10 of the accompanying drawings operates substantially as described above, except for that the melt of the process material is delivered into the mold 1 by the blades of the impeller 25.

While particular embodiments of the invention have been shown and described, various modifications thereof will be apparent to those skilled in the art and therefore it is not intended that the invention be limited to the disclosed embodiments or to the details thereof and the departures may be made therefrom within the spirit and scope of the invention as defined in the claims.

What we claim is:

1. A centrifugal casting apparatus for casting from a melt comprising:
   a mold mounted for rotation about the vertical axis thereof and having a bottom provided with a through co-axial opening having vertical walls;
   a member having a helicoidally shaped surface, co-axially mounted within said mold for preventing shrink heads formation and having a lower portion extending through said opening outwardly and downwardly of said mold bottom, said member being adapted to be immersed into said melt for cleaning its surface from slag;

a rotation drive connected with said mold and said member; and a vertical motion drive connected with said mold and said member.

2. An apparatus, as claimed in claim 1, wherein said member is a screw.

3. An apparatus, as claimed in claim 2, wherein the ratio between the diameter of said screw and the diameter of said opening in said bottom is from 0.1 to 1.

4. The apparatus of claim 1, wherein said member has the form of a helicoidally shaped plate which is essentially a screw.

5. An apparatus, as claimed in claim 2, wherein said screw has a length equal to the height of said mold.

6. An apparatus, as claimed in claim 2, wherein the flight of said screw has the form of a tube having an open lower end and an open upper end.

7. An apparatus, as claimed in claim 2, wherein said screw is a multiple-start one.

8. An apparatus, as claimed in claim 7, wherein said screw is provided with a number of flights which corresponds to 2 to 6 starts.

9. An apparatus as claimed in claim 2, wherein said screw and said mold are differentially connected with the rotation drive.

10. An apparatus, as claimed in claim 9, wherein said screw and said mold are mounted on the ends of co-axially arranged output shafts of a differential gear having an input shaft connected to said rotation drive.

11. An apparatus, as claimed in claim 10, wherein said differential gear has a gear ratio which enables the ratio between the angular speed of the screw and that of the mold to be maintained within the range of 1 to 2.

12. An apparatus, as claimed in claim 1, wherein said member is rigidly connected with said mold.

13. An apparatus, as claimed in claim 12, wherein said member has the form of helicoidally arranged protrusions on the inner surface of said opening in said bottom of said mold.

14. An apparatus, as claimed in claim 12, wherein said member is an impeller having blades secured to said bottom of said mold.

* * * * *